(12) United States Patent
Jahani et al.

(10) Patent No.: US 7,412,866 B2
(45) Date of Patent: Aug. 19, 2008

(54) TUBULAR ARTICLES WITH VARYING WALL THICKNESS AND METHOD OF MANUFACTURING SAME

(75) Inventors: Mamad Jahani, Ontario (CA); Colin Newport, Ontario (CA)

(73) Assignee: ArcelorMittal Tubular Products Canada Inc., Hamilton, Ontario (CA)

( * ) Notice: Subject to any disclaimer, the term of this patent is extended or adjusted under 35 U.S.C. 154(b) by 48 days.

(21) Appl. No.: 11/261,369

(22) Filed: Oct. 28, 2005

(65) Prior Publication Data

US 2006/0131949 A1    Jun. 22, 2006

Related U.S. Application Data

(60) Provisional application No. 60/622,614, filed on Oct. 28, 2004.

(51) Int. Cl.
*B21D 17/02* (2006.01)
*B60B 37/00* (2006.01)

(52) U.S. Cl. ............. 72/370.01; 72/370.14; 72/370.15; 72/370.23; 72/260; 72/276; 72/283; 301/124.1

(58) Field of Classification Search ............ 72/260, 72/370.14, 370.15, 370.23, 370.01, 264, 72/276, 283
See application file for complete search history.

(56) References Cited

U.S. PATENT DOCUMENTS

| | | | |
|---|---|---|---|
| 2,325,559 A * | 7/1943 | Washam, Jr. ................ 72/148 |
| 3,240,043 A * | 3/1966 | Sieger ......................... 72/148 |
| 3,837,205 A | 9/1974 | Simon |
| 3,841,131 A * | 10/1974 | Gross et al. .................. 72/148 |
| 4,296,623 A * | 10/1981 | Eibe ............................ 72/227 |
| 4,301,672 A | 11/1981 | Simon |
| 4,307,910 A | 12/1981 | Rodney |
| 4,380,480 A | 4/1983 | Delfino et al. |
| 4,435,972 A | 3/1984 | Simon |
| 4,616,500 A * | 10/1986 | Alexoff ....................... 72/283 |
| 5,213,250 A | 5/1993 | Simon |
| 5,303,985 A | 4/1994 | Barnholt et al. |
| 5,333,775 A | 8/1994 | Bruggemann et al. |
| 5,335,713 A * | 8/1994 | Hoppmann et al. ......... 164/441 |
| 5,535,610 A * | 7/1996 | Noe et al. .................... 72/8.6 |
| 6,279,695 B1 | 8/2001 | Davison |
| 6,439,672 B1 | 8/2002 | Simon |
| 6,502,445 B1 * | 1/2003 | Drigani et al. .............. 72/148 |
| 6,572,199 B1 | 6/2003 | Creek et al. |
| 2004/0060385 A1 | 4/2004 | Prucher |

FOREIGN PATENT DOCUMENTS

WO    WO 02/081115 A1    4/2002

\* cited by examiner

*Primary Examiner*—Dmitry Suhol
(74) *Attorney, Agent, or Firm*—Patzik, Frank & Samotny Ltd.

(57) ABSTRACT

A method for manufacturing a one-piece axle tube housing with localized sections of increased wall thickness includes providing a tube blank, inserting a mandrel having a reduced diameter profile, passing the tube through an extrusion die to conform the tube to the shape of the mandrel; and extraction of the mandrel from the tube to cause outward deformation of the tube at specific locations. A further reducing step may be used to form the final desired profile, including reduced inner and outer diameters along sections of the axle tube housing.

9 Claims, 9 Drawing Sheets

TUBULAR ARTICLES WITH VARYING WALL THICKNESS AND METHOD OF MANUFACTURING SAME

CROSS-REFERENCE TO RELATED APPLICATIONS

This application claims the benefit of United States Provisional Patent Application No. 60/622,614 filed on Oct. 28, 2004, the content of which is herein incorporated by reference.

FIELD OF INVENTION

The present invention relates generally to tubular articles. In particular, the invention relates to a one-piece axle housing having varying wall thickness and a method of manufacturing same.

BACKGROUND OF INVENTION

Structural tubular products have a wide range of applications. Some examples include construction and architectural applications, structural components for vehicles and industrial equipment, and transmission towers, highway guardrails, light posts and other structures. Tubular components can often combine strength with significant weight and material reduction.

One application of such tubular products is axle housing assemblies. Typically, such axle housing assemblies include an axle housing and other components such as brake flanges or spiders, spring seats, shock absorber pads, among others. The axle housing has an axle housing tube (which encloses the axle shaft) and a spindle located at the terminal ends of the axle tube (for engaging the wheel or bearing parts).

Typically, different parts of an axle housing have different load or strength requirements. Accordingly, these parts have different internal or external diameters and wall thickness, optimized for each part to meet the structural requirements and to reduce weight. Generally, all of the aforementioned parts are formed separately and subsequently welded together to form the axle housing. However, the various forming and welding steps are time and labour intensive, and also tend to introduce some undesirable side-effects, especially at the locations of weld.

For example, as is known in the art, axle spindles generally require a larger wall thickness than the axle tube due to the increased strength demands. As such, it is common for the spindles to be forged separately and subsequently attached (by such means as friction welding) to the axle tube. Examples of such a two-step method are taught in U.S. Pat. Nos. 3,837,205 and 6,279,695. However, as indicated above, the requirement for welding increases the cost of the final article. Moreover, due to the high temperatures generated and required by the known welding methods, the strength of the metal surrounding the welded regions are known to be reduced.

U.S. Pat. No. 4,435,972 teaches a multi-step method for forming an axle housing that uses a series of mandrels to form the required cross sectional profile. This method is limited to tubes with a uniform external diameter, with internal diameters varied along the length of the axle housing to provide the desired cross sectional profile. Further, this method is limited to forming tubes made of steel having high formability characteristics and could not be used to form heavy duty axles housings.

Therefore there is a need for developing a new design for tubular products that will contribute to overall weight reduction while increasing durability and load bearing capability. It is an object of the present invention to mitigate or obviate at least one of the above mentioned disadvantages.

SUMMARY OF INVENTION

In one aspect of the invention, there is provided a tubular article extruded from a one-piece blank. The tubular article has an internal longitudinal cross sectional profile and an external longitudinal cross sectional profile, the internal and the external longitudinal cross sectional profiles defining a wall therebetween. The wall has varied wall thickness along the tubular article and includes at least one interior bulge and one exterior bulge for enhancing strength locally.

In one aspect of the invention, there is provided an axle housing assembly. The axle housing assembly has support and load bearing components and a tubular member, the support and load bearing components being attached to the tubular member and defining load bearing regions on sections of the tubular member. The tubular member has localized structural enhancements in the load bearing regions.

In a further aspect, there is provided a method for manufacturing a tubular article having a longitudinal cross sectional profile including sections of increased wall thickness. The method includes the steps of a) providing a tubular blank having an inner surface, an outer surface and a transverse cross sectional circumference; b) axially inserting a mandrel into the tubular blank, the mandrel having sections of reduced cross sectional area complementary to the longitudinal cross sectional profile; c) forcing the tubular blank with the mandrel contained therein through a throat of an extrusion die, the throat being sized smaller than the transverse cross sectional circumference of the tubular blank, thereby applying a force on the blank to force the inner surface of the blank to conform to the sections of reduced cross sectional area of the mandrel to form the sections of increased wall thickness; and d) withdrawing the mandrel from the tubular blank, thereby applying an outward force on the blank to cause outward deformation of the sections of increased wall thickness.

In other aspects the invention provides various combinations and subsets of the aspects described above.

BRIEF DESCRIPTION OF DRAWINGS

For the purposes of description, but not of limitation, the foregoing and other aspects of the invention are explained in greater detail with reference to the accompanying drawings, in which.

DETAILED DESCRIPTION OF EMBODIMENTS

Figure 1:
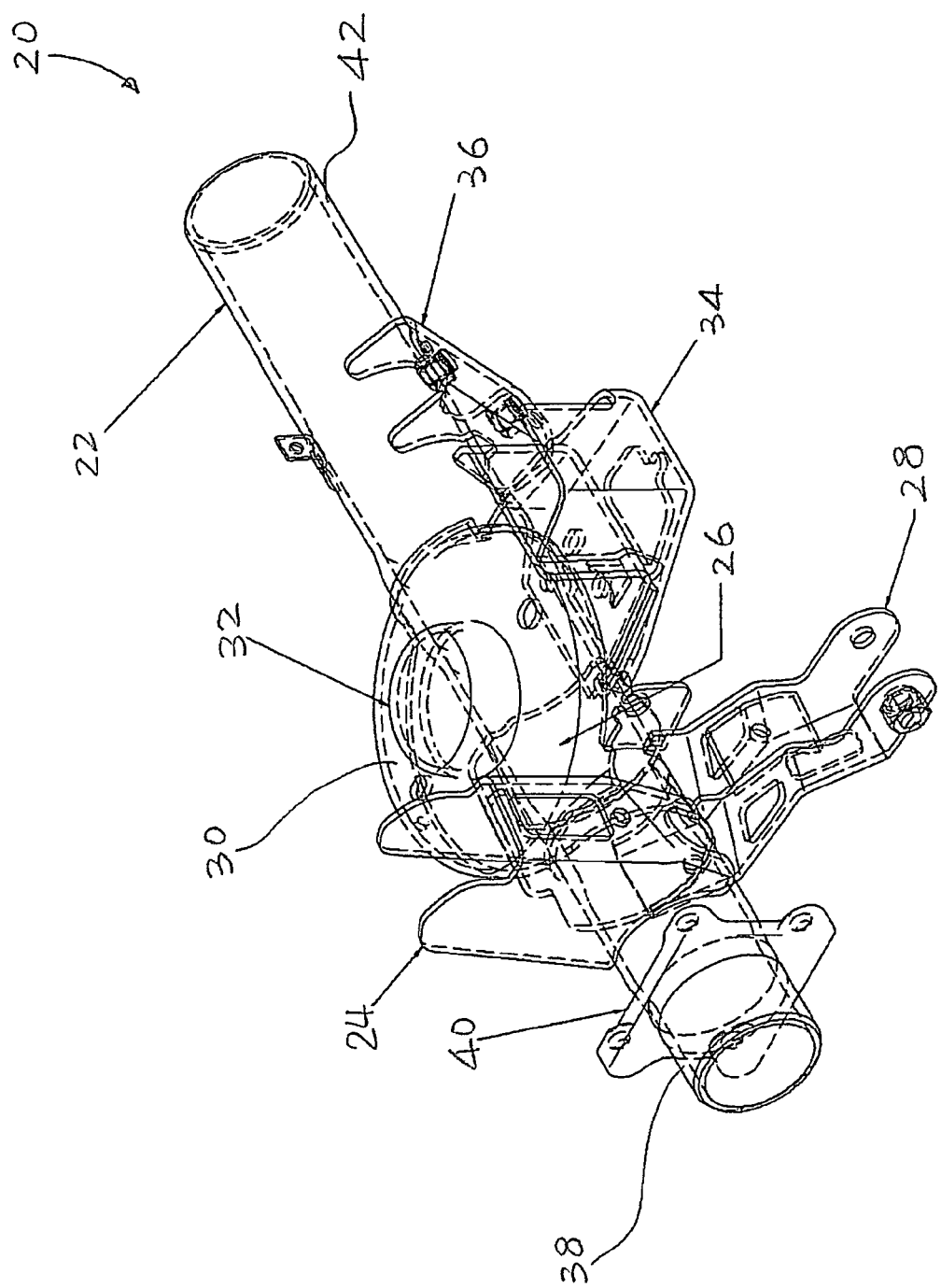
FIG. 1 is a perspective view of an axle housing assembly that includes a multiwall™ tube.

The description which follows, and the embodiments described therein, are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

FIG. 1 is a perspective view of an axle housing assembly, generally designated as 20, that has an axle housing, namely, a multiwall tube 22. Supported on the multiwall tube 22 are two control arm brackets, namely an upper control arm bracket 24 and a lower control arm bracket 26. Opposite upper control arm bracket 24 is a shock bracket 28 for attaching a shock absorber (not shown) thereto. Adjacent and inboard of the two control arm brackets is a spring seat 30. Spring seat 30 has a general circular shape with a central circular head 32 for supporting a coiled spring (not shown). Spring seat 30 rests upon and is supported by the multiwall tube 22. A track bar bracket assembly 34 is mounted to the multiwall tube 22 in a region generally below spring seat 30 for providing further support. A stab bar bracket 36 is mounted to the multiwall tube 22 in the general vicinity of track bar bracket assembly 34. The multiwall tube 22 has a flange end 38 for mounting a flange 40 and a carrier end 42. Mounted to the flange end 38 is a flange 40 for attaching axle housing 20 to the vehicle. The axle housing 20 may be attached to, for example, a differential box (not shown), which is in turn mounted to a vehicle's frame. The carrier end 42 is generally fitted to a brake assembly for mounting a wheel. As will be understood, the wheels of a vehicle are attached to axle shafts. Coiled springs (or other springs) and the shock absorbers, located between the axle housing and the vehicle's frame, help to support the weight of the vehicle.

As will be appreciated, different sections of the multiwall tube 22 tend to have different static or dynamic loads. Some regions may be subject to larger loads than their neighboring regions. For example, the portions of the multiwall tube 22 that support load bearing structures, such as spring seat 30, flange 40 and shock bracket 28, generally are subject to larger loads. A tubular axle housing of uniform wall thickness can be produced. To meet the maximum load requirements, such a tubular axle housing will require more material than is necessary. By varying wall thickness along a tube and applying local enhancements in heavy load regions to meet the load requirements, the overall weight can be advantageously reduced.

Figure 2:
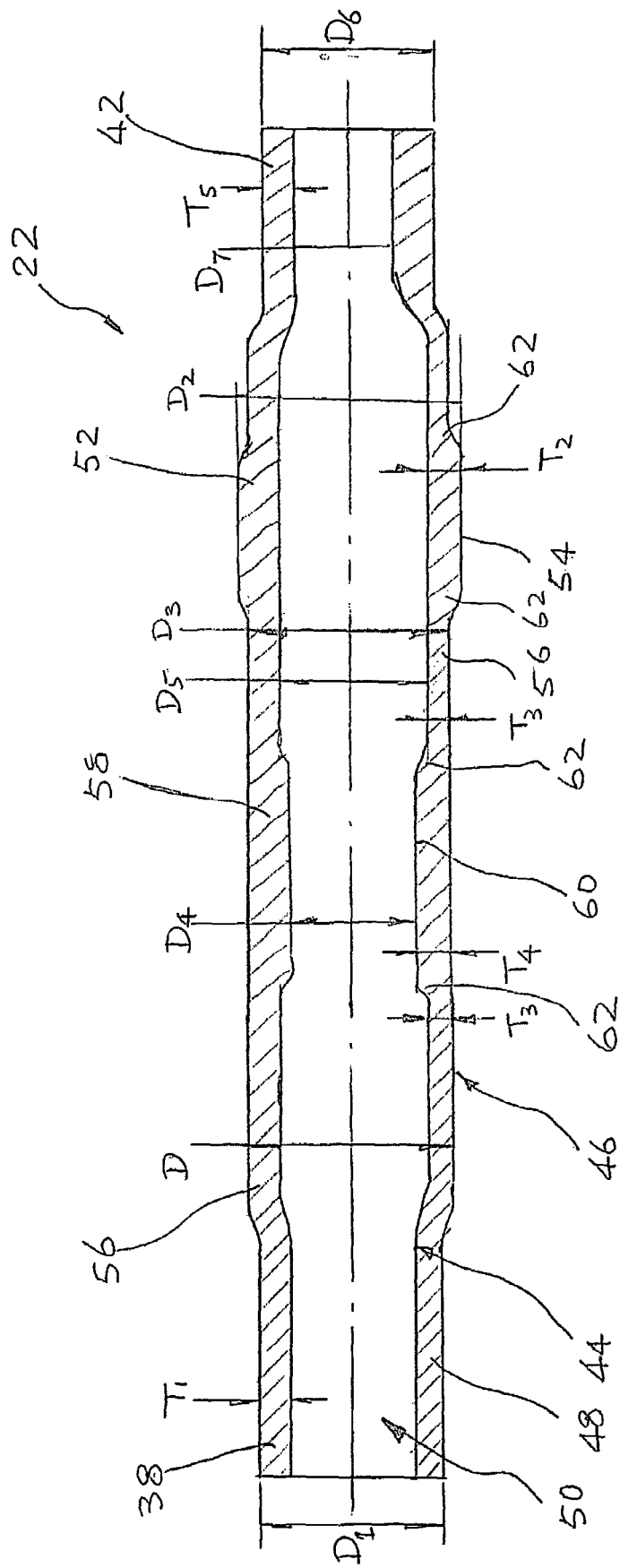
FIG. 2 is a longitudinal cross-sectional view of the multiwall tube shown in FIG. 1.

FIG. 2 is a longitudinal cross sectional view of the multiwall tube 22. The cross sectional view shows that the multiwall tube 22 has an internal cross sectional profile 44 and an external cross sectional profile 46, which together define a tube wall 48 of varying thickness along the length of the multiwall tube 22. The internal cross sectional profile 44 also defines a bore 50 or throughhole extending along the length of the multiwall tube 22. The tube is generally cylindrical. Its transverse cross section along the length of the tube, which defines a transverse cross sectional circumference, is generally circular and is not shown here. It will be understood that other types of transverse cross sectional shapes, such as oval, generally rectangular, triangular or other shapes, are also possible.

The wall thickness of the multiwall tub 22 is varied along its length to provide localized structural enhancement. The increase in wall thickness can either be a localized increase of external diameter, which produces an exterior bulge, a localized decrease of internal diameter which produces an internal bulge, or a combination of both. An example of such a variation of wall thickness is shown in FIG. 2. As illustrated in FIG. 2, the multiwall tube 22 has regions of normal load 56 and four regions of increased wall thickness, namely, a carrier end region 42, a spring load region 52, a shock absorber load region 58, and a flange end region 38. The regions of normal load 56 have an external diameter $D_3$, an internal diameter $D_5$ and a wall thickness $T_3$. Toward the flange end 38, the tube wall 48 has a wall thickness $T_1$ and an external diameter $D_1$. In the spring load region 52, namely a high stress region that supports the spring seat 30, an exterior bulge 54 is formed on the external surface of the multiwall tube 22. The spring load region 52 has an external diameter $D_2$ and a wall thickness $T_2$: $D_3 < D_2$, and $T_3 < T_2$. In the shock absorber load region 58, there is provided an interior bulge 60. The interior bulge 60 has an inner diameter $D_4$ that is less than the inner diameter $D_5$ of the normal load region 56. As shown, the interior bulge 60 has a wall thickness $T_4$ that is larger than the wall thickness $T_3$ in the normal load region 56. Toward the carrier end 42, the multiwall tube 22 has a generally constant external diameter $D_6$ and a generally constant inner diameter $D_7$. Its wall thickness $T_5$ is larger than $T_3$ to provide better load bearing capability. As the tube is generally cylindrical, it will be understood that the external diameters $D_1$, $D_2$, $D_3$ and $D_5$ generally define the transverse cross sectional circumferences of the tube in these regions.

As can be seen from FIG. 2, each of the high stress regions has a wall thickness that is greater than that of the normal load regions 56. These high stress regions can attain the desired wall thickness, and therefore the desired strength, by increasing the external diameter while keeping the internal diameter unchanged, decreasing the internal diameter while keeping the external diameter unchanged, or decreasing the internal diameter more than the external diameter, among others. These increased or decreased diameters, external or internal, along the length of the multiwall tube 22 are generally determined based on various design considerations, such as matching the sizes of parts attached to the axle housing or providing sufficient internal clearance for the axle shaft and components mounted on the axle shaft. It will be appreciated that other internal and external cross sectional profiles of the multiwall tube 22 are possible, depending on the design requirements. The ability to vary both internal and external diameters along the length of the multiwall tube 22 advantageously provides the flexibility in designing tubular components, such as axle housings.

As shown in FIG. 2, a high stress region is generally flanked by two transition regions 62 such that one may view a bulge as consisting of an increased wall thickness region and two flanking transition regions. A transition region joins a high stress region to the normal load region 56 and provides a smooth, gradual transition of wall thickness from the high stress region to the normal load region. These gradual changes in wall thickness generally tend to assist reduction of stress levels in the transition regions and management of overall stress in the tube. Typically, the transitional regions tend to occupy a relatively small portion of the bulge so that the bulge is substantially a constant wall thickness region. However, it will be understood that a bulge can also consist of mostly the flanking transition regions 62, with a relatively short constant wall thickness region in between.

As described, by providing localized structural reinforcements with varying wall thickness, the wall thickness of the multiwall tube 22 may be adjusted along its length to meet the final structural needs. This helps to reduce mass at locations with low stress loads without sacrificing the strength at high stress regions, thereby helping reduce the overall costs and material mass requirements.

Further, as will be appreciated, local structural enhancements as described here are not limited to reducing stress levels locally for meeting stress requirements. It may also be applied at various locations where locally enhanced stiffness is required. For example, in regions where there is a requirement for locally enhanced stiffness, an exterior bulge 54 as shown in FIG. 2 can be applied to achieve the required stiffness, without significant increase of the overall mass or dimension.

Figure 3:
FIG. 3 is a longitudinal cross-sectional view of a tube blank from which the desired axle housing tube shown in FIG. 2 is formed.

FIG. 3 is a longitudinal cross-sectional view illustrating a tube blank from which the desired tubular axle housing is formed. As shown, the tube blank 64 is a cylindrical tube having an initial outer diameter $\Phi_0$ and an initial wall thickness $T_0$, both of which are generally constant along the length of the tube's longitudinal axis 66. This results in the tube blank 64 having a generally constant inner diameter $\Phi_i$. The outer diameter $\Phi_0$ of the tube blank 64 is less than the outer diameter $D_3$ of the normal load region 56 of the desired final product, as will become clear in the following description.

Figure 4A:
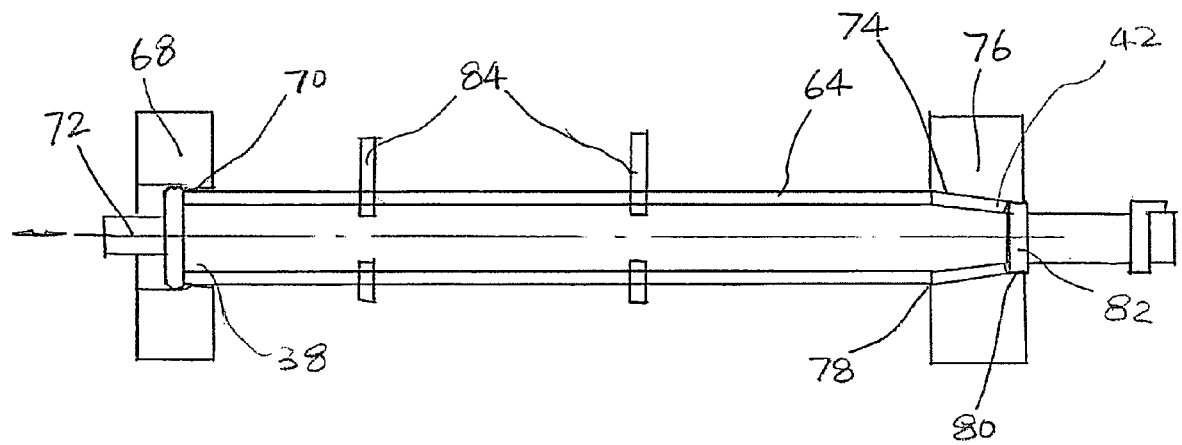
FIG. 4A is a frontal view showing the blank tube of FIG. 3 having one end cold reduced.

As illustrated in FIG. 4A, the first step of the method of the invention involves cold reducing the diameter of the second end, or the carrier end 42 of the tube blank 64. Often, this is known as crimping or "nosing" a tube blank 64. As shown in FIG. 4A, the tube blank 64 is held at one end, the flange end 38, by a bumper ring 68. Bumper ring 68 has a throughbore 70 that permits the tube blank 64 to pass therethrough. A nosing ram 72 is inserted into the throughbore 70 and pressed against tube blank 64 at its end surface of the flange end 38 to deliver a longitudinal compression force on the end surface. The opposite end, or the carrier end 42, of the tube blank 64 is inserted in the tapered hole 74 of a nosing die 76. The tapered hole 74 has a wide opening 78 that has a diameter larger than $\Phi_0$ for receiving the carrier end 42. The tapered hole 74 has a small opening 80. The diameter of small opening 80 is smaller than $\Phi_0$. As the tube is compressed longitudinally, the outer diameter of the carrier end 42 gradually decreases to conform with the profile of the tapered hole 74, or being "nosed." The movement of the tube blank 64 is restricted by a stop 82 placed inside the tapered hole 74 near its small opening 80. Preferably, the middle portion of the tube blank 64 is supported by a pair of grippers 84 to provide stability while the tube blank is being "nosed."

Such "nosing" serves to limit the advancement of a mandrel when the mandrel is inserted into and forcibly advanced along the nosed tube to force the tube longitudinally through a die, as will be described below. "Nosing" also helps prevent the mandrel from extending beyond the desired position. However, nosing is not necessary, and is only for convenience. For example, providing a mandrel with a shoulder and placing a nosed tube against the shoulder also can force the tube longitudinally while limiting the advancement of the mandrel within the tube. Further, as known in the art, it is often preferred for the tube to be lubricated to facilitate passage of the mandrel.

Figure 4B:
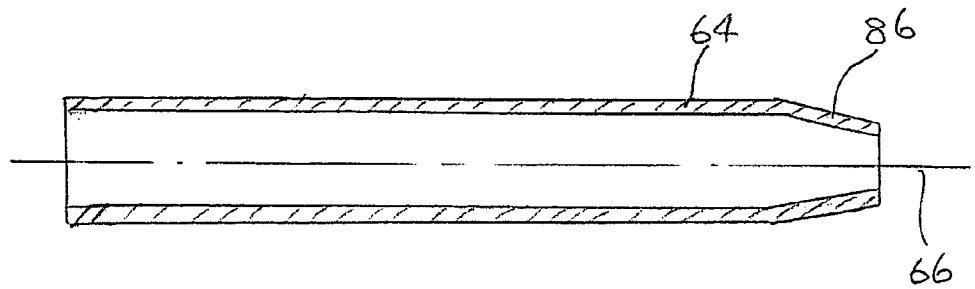
FIG. 4B is a longitudinal cross-sectional view of the nosed, or cold reduced, blank obtained from a step illustrated in FIG. 4A.

As can be seen in FIG. 4B, the nosed tube blank 64 has a nosed section 86 at one end. The nosed section 86 is tapered, with its outer diameter gradually decreasing toward the end of the tube blank 64. As the nosing operation tends not to change significantly the wall thickness, the inner diameter of the nosed section 86 generally decreases at the same rate as the outer diameter along the tube's longitudinal axis 66.

Figure 5:
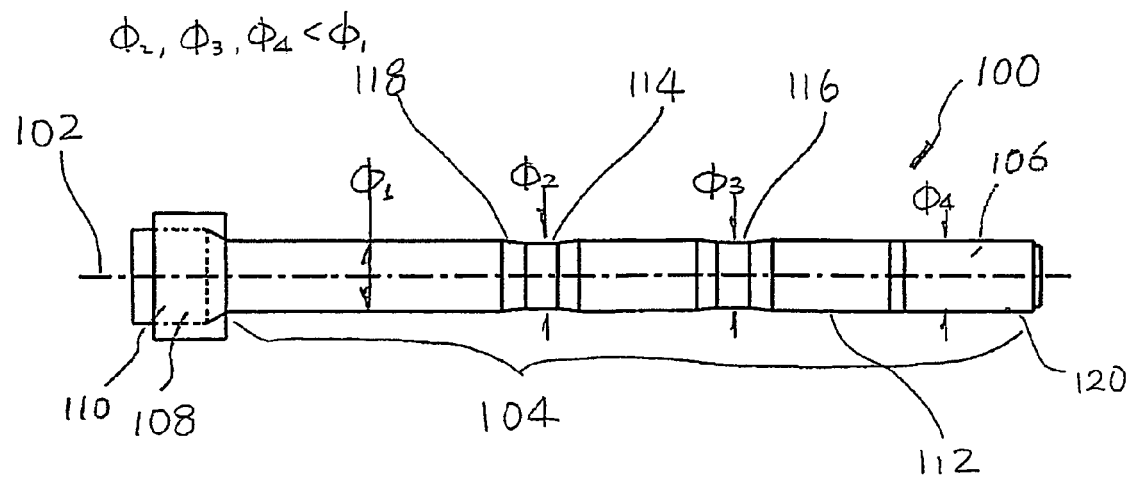
FIG. 5 is a frontal view illustrating a mandrel for forming an axle housing having the profile shown in FIG. 2.

The next step of the method of the invention involves the insertion of a cold forming mandrel into the nosed tube blank 64. The mandrel used for this step is illustrated in FIG. 5. As shown, the mandrel 100 is generally cylindrically shaped having a central axis 102 and a main body 104 of a generally constant outer diameter $\Phi_1$. It will be understood that the mandrel 100 is shaped and sized to permit its insertion into a tube blank 64. The outer diameter $\Phi_1$ of the mandrel main body 104 generally corresponds to the inner diameter $\Phi_i$ of the tube blank 64. However, as will be understood by persons skilled in the art, diameter $\Phi_1$ may be slightly less than diameter $\Phi_i$ in order to facilitate the insertion of the mandrel into the tube blank 64.

The mandrel 100 includes a first end 106 and an opposite second end 108. First end 106 of the mandrel has a complementary shape corresponding to the carrier end 42 of the finished multiwall tube 22. The second end 108 of the mandrel 100 is generally provided with a clamping portion 110 to which can be attached an arm or clamp (not shown) for moving the mandrel within the tube blank 64 (as described further below).

The main body 104 of the mandrel 100 has a longitudinal cross sectional profile 112 that is generally determined from the internal cross sectional profile 44 and the external cross sectional profile 46 of the finished multiwall tube 22, that is to say, that the outer diameter of the main body 104, although generally constant, is smaller in regions generally corresponding to either exterior bulge 54 or interior bulge 60. More specifically, in one embodiment, the main body 104 has a first reduced diameter section 114 corresponding to the shock absorber load region 58 and a second reduced diameter section 116 corresponding to the spring load region 52. The outer diameters $\Phi_2$, $\Phi_3$ of the reduced diameter sections are smaller than the diameter $\Phi_1$. Each of these two reduced diameter sections is flanked by transitional regions 118 on each side. The purpose of the first reduced diameter section 114 and the second reduced diameter section 116 will become apparent in the following description of the invention. In addition, the end section 120 at end 106 may be a reduced diameter section itself, namely the end section 120 may have an external diameter $\Phi_4$ that is also smaller than the diameter $\Phi_1$ of the main body 104.

As indicated above, the next step in the method of the invention is to insert the mandrel 100 into the tube blank and this is illustrated in FIGS. 6(a) and 6(b). In this step, the mandrel 100 is inserted into the tube blank 64 of FIG. 3, or nosed tube blank 64 as shown in FIG. 4B if the tube blank is first "nosed", by inserting the first end 106 of the mandrel into the carrier end 42 of the tube blank. As indicated above, the main body 104 of the mandrel 100 has its outer diameters $\Phi_1$ to $\Phi_4$ sized so as to be slidably received within the inner diameter $\Phi_i$ of the main body of the tube blank 64.

As shown in FIG. 6(a), a ram or punch 122 pushes the tube blank 64 through a bore of a first die 124 along a direction indicated by the arrow. A mandrel 100 is held stationary on the other side of the first die 124 and generally aligned with the axis of the first die 124. As the tube blank 64 is continuously pushed toward the mandrel 100, it is first pushed through the bore of the first die 124. The tube blank 64 is then advanced over the mandrel 100, namely, the mandrel is inserted into the tube. The tube blank 64 advances over the mandrel 100 until the first end 106 of the mandrel reaches the nosed section 86, or, if the tube blank is not nosed, the first end, or the flange end 38 of the tube blank 64, as shown in FIG. 6(b). As the outer diameter $\Phi_1$ of the main body 104 of the mandrel 100, and the diameters $\Phi_2, \Phi_3, \Phi_4$ of the reduced diameter sections of the mandrel 100, are generally slightly smaller than the inner diameter $\Phi_i$ of the tube blank 64, during insertion of the mandrel 100 into the tube blank 64, the blank is not materially deformed.

In the above description, the mandrel 100 is described to remain stationary and the tube to be advanced over the mandrel. However, it will be understood that it is also possible for the mandrel to be advanced through the blank 64. Similarly, it is possible for both the tube and the mandrel to be advanced toward each other.

Once the mandrel 100 is advanced to the desired position within the blank 64, a extrusion die 200, such as a reducing die, is mounted over the flange end 38, as shown in FIG. 6(c). The mandrel 100, now inserted into tube blank 64, is advanced in a direction shown by arrow 202 and forces the tube blank 64 through the extrusion die 200, as shown in FIG. 6(d). The mandrel 100 is continuously moved toward the extrusion die 200 until the entire length of the blank 64 is forced through the die, as shown in FIG. 6(e).

It will be understood that once the die is mounted over the tube blank 64 and during passage of the length of the tube through the die, the die will be anchored so as to prevent its movement. Further, although it is described here that the die is held stationary while the tube is forced through the die, it is also possible that the die is moved over the length of the tube while one end of the tube and the mandrel located therein are anchored.

Figure 7A:
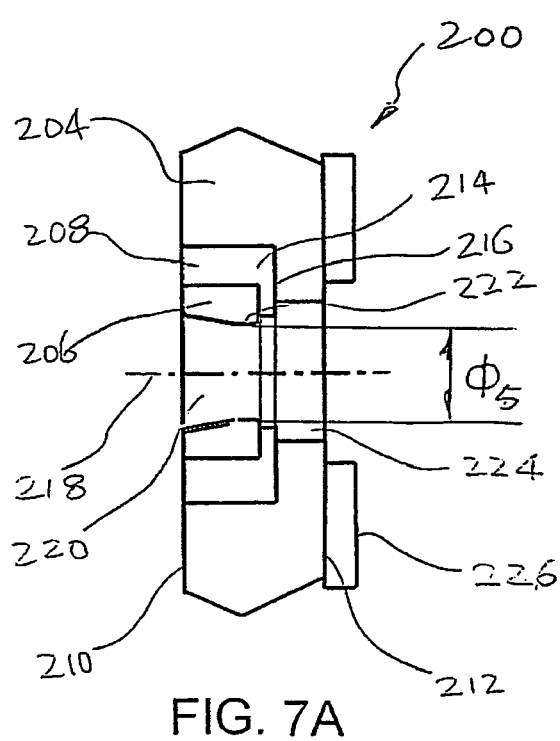
FIGS. 7A and 7B illustrate in cross-sectional views an extrusion die for forming an axle housing having the profile shown in FIG. 2.
Figure 7B:
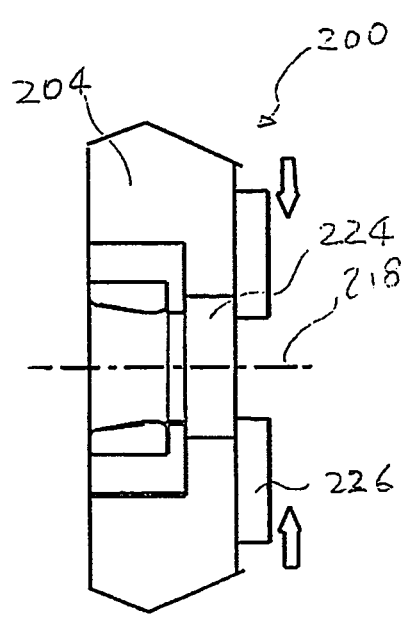

An embodiment of the die according to the present invention is shown in FIGS. 7A and 7B. As shown, the extrusion die 200 has a generally annular shaped body having three sections: a die body 204, a generally annular forming ring 206, and an intermediate ring 208 between the die body 204 and the annular forming ring 206. The die body has a first surface 210 and a second surface 212. During extrusion, the die is mounted such that the first surface 210 faces towards the tube blank 64 and the second surface faces away from the tube blank. On the first surface 210 of the die body 204, there may be formed a recess 214 to receive the intermediate ring 208. The recess 214 preferably includes a shoulder 216 to maintain the intermediate ring in position. Similarly, the intermediate ring 208 may have its own recess and shoulder for receiving the forming ring 206 and maintaining the forming ring in position.

The forming ring 206 has a symmetry axis 218, which is preferably aligned with that of the intermediate ring 208. The forming ring has a throughhole 220, which may be of constant diameter or tapered toward the second surface 212. FIG. 7A shows a forming ring 206 that has a tapered throughhole 220 with a diameter $\Phi_5$ at its smallest opening, or throat 222. In general, $\Phi_5$ matches the outer diameter $D_3$ of the normal load region 56 of the multiwall tube 22 and is generally less than the initial outer diameter $\Phi_0$ of the tube blank 64. The larger opening of the tapered throughhole 220 has a diameter generally slightly larger than the outer diameter $\Phi_0$ of the tube blank 64 to facilitate positioning the tube in the throughhole 220. The die body 204 also has a center hole 224 extending between the recess 214 and the second surface 212 and aligned with the throughhole 220 to permit an extruded tube to pass through the die.

A pair of stripper clamps 226 are provided at the second surface 212 of the extrusion die 200 and movable toward or away from the symmetry axis 218 of the forming ring 206. FIG. 7B shows the pair of stripper clamps 226 being moved toward the symmetry axis 218 and at a position to partially cover the center hole 224 of the die. The function of the stripper clamps 226 will become apparent in the following description of further steps of the method. It will be understood that various other configurations of the extrusion die 200 are known in the art and can be adapted for use in the present invention.

As indicated above, the extrusion die 200 is provided over the first end 106 of the tube having the mandrel 100 contained within. The mandrel is then forcibly moved axially toward the die. As the nosed section 86 of the tube has an end opening that is smaller than the diameter of the mandrel, the longitudinal force applied to the mandrel is transmitted to the tube and forces the tube through a ring like gap, i.e., a ring-like orifice formed between the throat 222 of the die and the body of the mandrel. The terminal position of the mandrel 100, after traveling roughly the length of the blank 64, is shown in FIG. 6(e).

The mandrel 100 does not travel the same length of the extruded tube, but generally less. As can be seen, the passage of the blank 64 through the die 200 forces the tube inner wall to conform to the outer shape, or the cross sectional profile 112, of the mandrel 100. That is, after the tube blank 64 passes through the extrusion die 200, the inner wall of the extruded tube tends to include mirror images of the first reduced diameter section 114 and second reduced diameter section 116 of the mandrel. Furthermore, since, as indicated above, the throat diameter $\Phi_5$ of the forming ring 206 is less than the outer diameter $\Phi_0$ of the tube blank 64, the tube outer diameter will be reduced during passage of the die. As can be seen in FIG. 6(d), once a section of the tube blank 64 passes through extrusion die 200, the section tends to have a generally uniform outer diameter $\Phi_6$, which generally corresponds to diameter $\Phi_5$. However, since the outer diameter $\Phi_1$, of the mandrel 100 is generally the same as the inner diameter $\Phi_i$ of the tube, during passage of the tube through the extrusion die 200, the wall thickness of the tube blank 64, over the main body 104 of the mandrel, will be reduced. Such reduction in wall thickness will result in an accumulation of tube material ahead of the extrusion die 200 as the carrier end 42 of the tube, is gradually forced toward the extrusion die. In the result, such accumulated material will concentrate within the space created by the reduced diameter sections of the mandrel and lengthen the tube as well.

In the above description, the extrusion die 200 is described as held stationary and the mandrel being advanced toward the die. However, it will be understood that it is also equally possible for the mandrel to remain stationary and for the die to move over the tube with the mandrel contained therein. Similarly, it is possible for both the tube and the die to be advanced toward each other.

Once the entire length of the tube blank 64 passes through the extrusion die 200, the mandrel 100 is removed as shown in FIGS. 6(e) and 6(f). To remove the mandrel, the pair of stripper clamps 226 are moved toward the symmetry axis of the forming ring 206 until they rest upon the main body 104 of mandrel and between the second surface 212 of the die body 204 and the tube blank 64. In this position, when the mandrel is withdrawn from the extrusion die, the stripper clamps 226 prevent the deformed tube from being withdrawn together with the mandrel and through the die. Instead, only the mandrel 100 is withdrawn. Alternatively, the mandrel can be held stationary while the tube is withdrawn by pulling it away from the die, namely, away from the second surface 212 of the die body 204.

Figure 6:
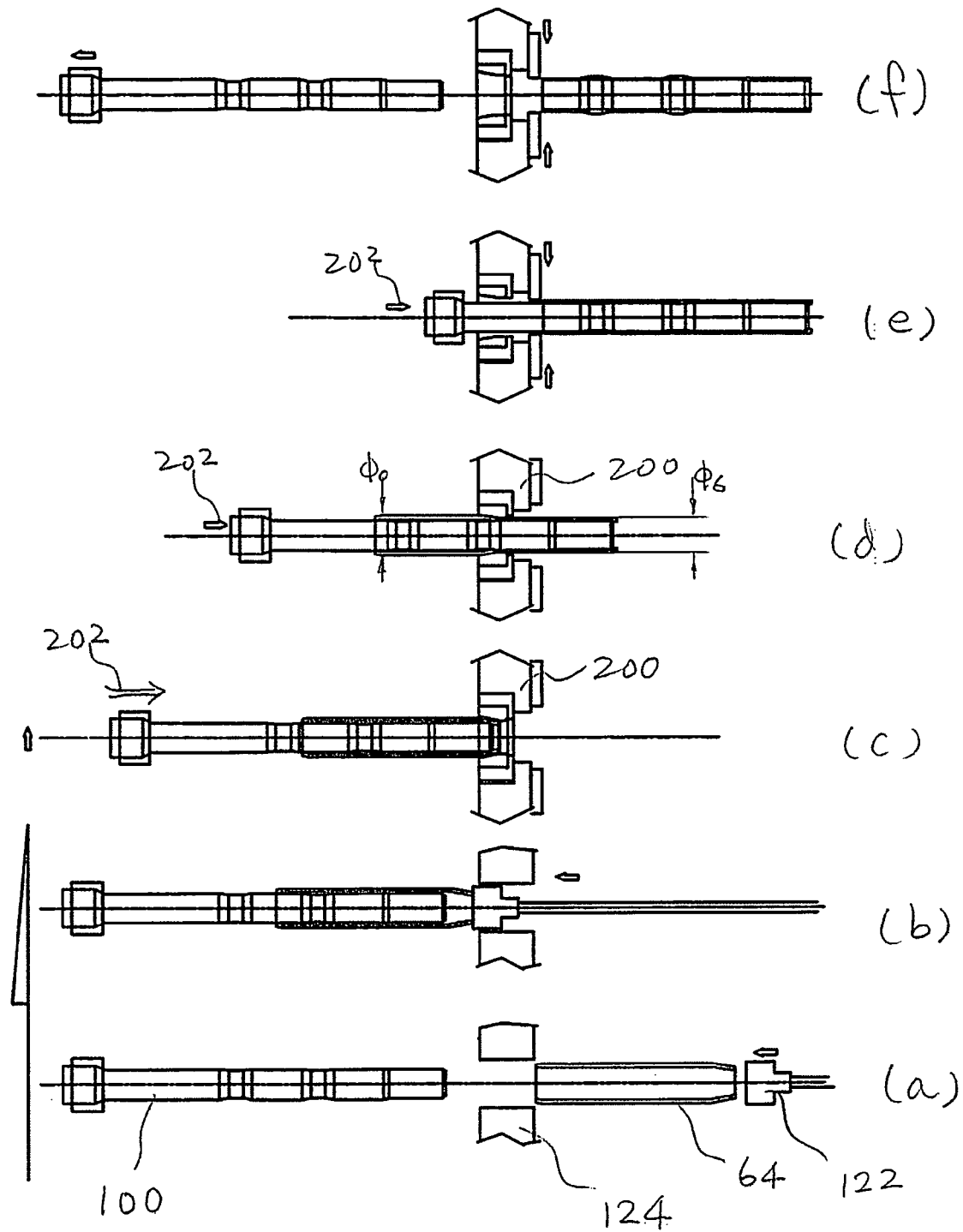
FIG. 6 illustrates schematically the successive steps for forming a tubular article having sections of increased wall thickness and a uniform internal cross sectional profile, from which an axle housing shown in FIG. 2 can be formed.

As the mandrel 100 (or tube blank 64) is withdrawn from the position shown in FIG. 6(*e*), the outer diameter of the tube blank 64 will deform as the larger sections of the mandrel, namely sections of the main body 104 where the outer diameter is not reduced, pass through narrower inner diameter sections of the tube blank 64. This forces the initially formed interior bulges to radially expand outward to become exterior bulges. For example, as the mandrel 100 is pulled out, the thickened section of the tube formed at the first reduced diameter section 114 of the mandrel 100 is forced radially outwards to form an exterior bulge 54. Similarly, the thickened section of the tube corresponding to the second reduced diameter section 116 is also forced radially outwards to form an exterior bulge. The description of the following steps will explain how an interior bulge 60 of a final tubular product as shown in FIG. 2 is formed, even though the process described thus far can only form exterior bulges.

Figure 8:
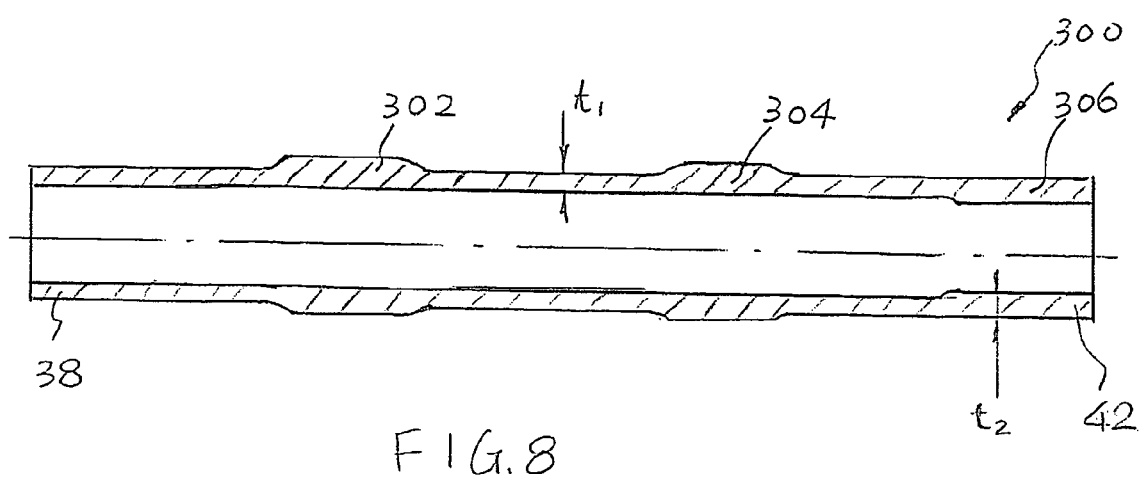
FIG. 8 is a longitudinal cross-sectional view of a tubular article obtained from the steps illustrated in FIG. 6.

The longitudinal cross section of the extruded tube 300, following complete withdrawal of the mandrel, can be seen in FIG. 6(*f*) and is illustrated more clearly in FIG. 8. The thickened regions 302, 304 generally correspond to the reduced diameter sections 114, 116 of the mandrel 100, respectively. As the inner diameter of the extruded tube 300 generally is determined by the largest outer diameter of the mandrel as the mandrel is withdrawn from the tube, the inner diameter generally corresponds to the outer diameter $\Phi_1$ of the main body 104 of the mandrel. As described above, the main body of the extruded tube 300 is provided with a reduced wall thickness $t_1$, which is thinner than the initial thickness $T_0$. Further, as the mandrel has an end section 120 that has an outer diameter $\Phi_4$ smaller than that of the main body 104, the extruded tube 300 has a thickened end section 306 with a smaller inner diameter that generally corresponds to $\Phi_4$, and therefore an increased wall thickness $t_2$ at carrier end 42.

Figure 9A:
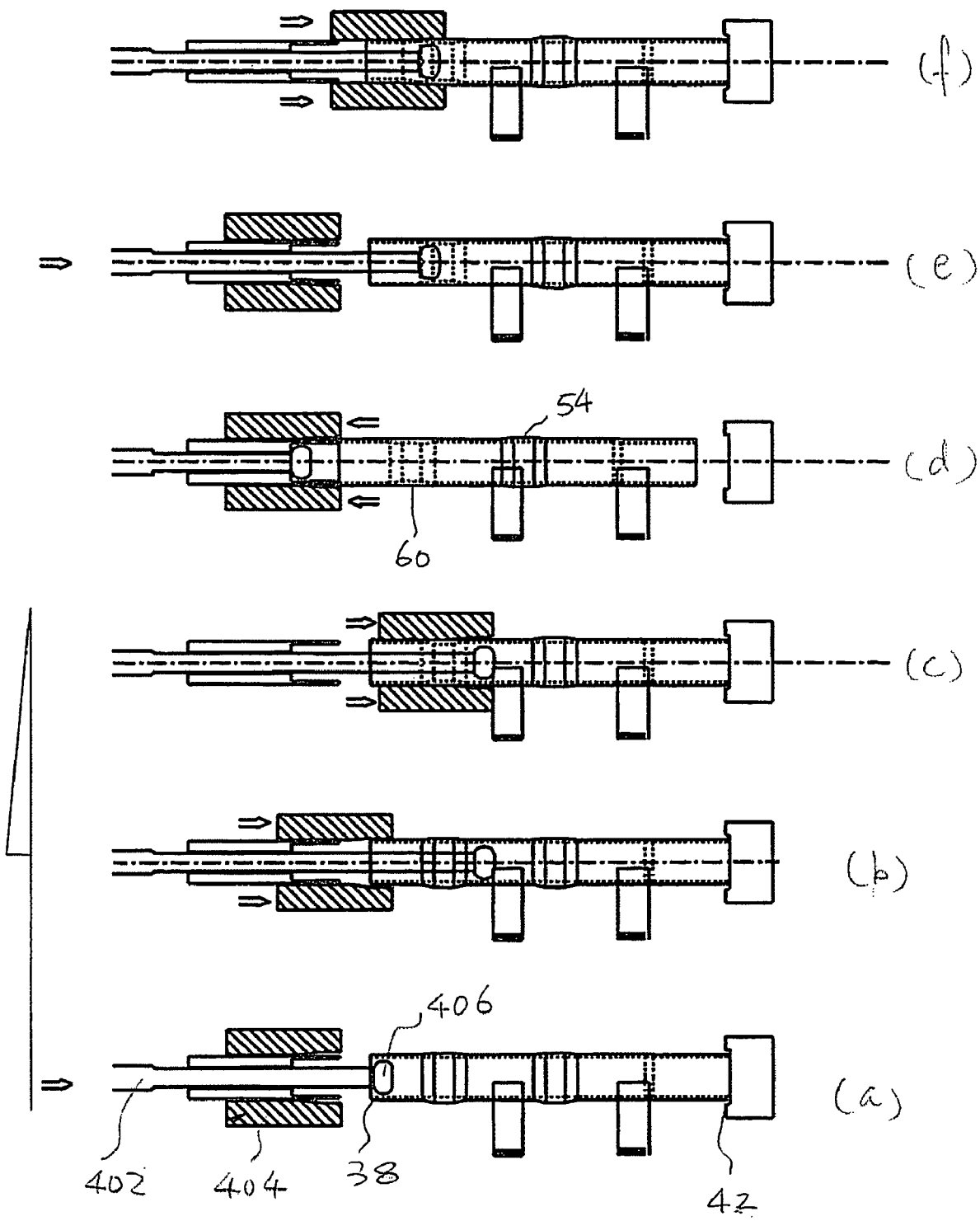
FIGS. 9A and 9B contain a series of schematic drawings to illustrate the successive steps for forming an axle housing having the cross-sectional profile shown in FIG. 2 from a tubular article shown in FIG. 8.
Figure 9B:
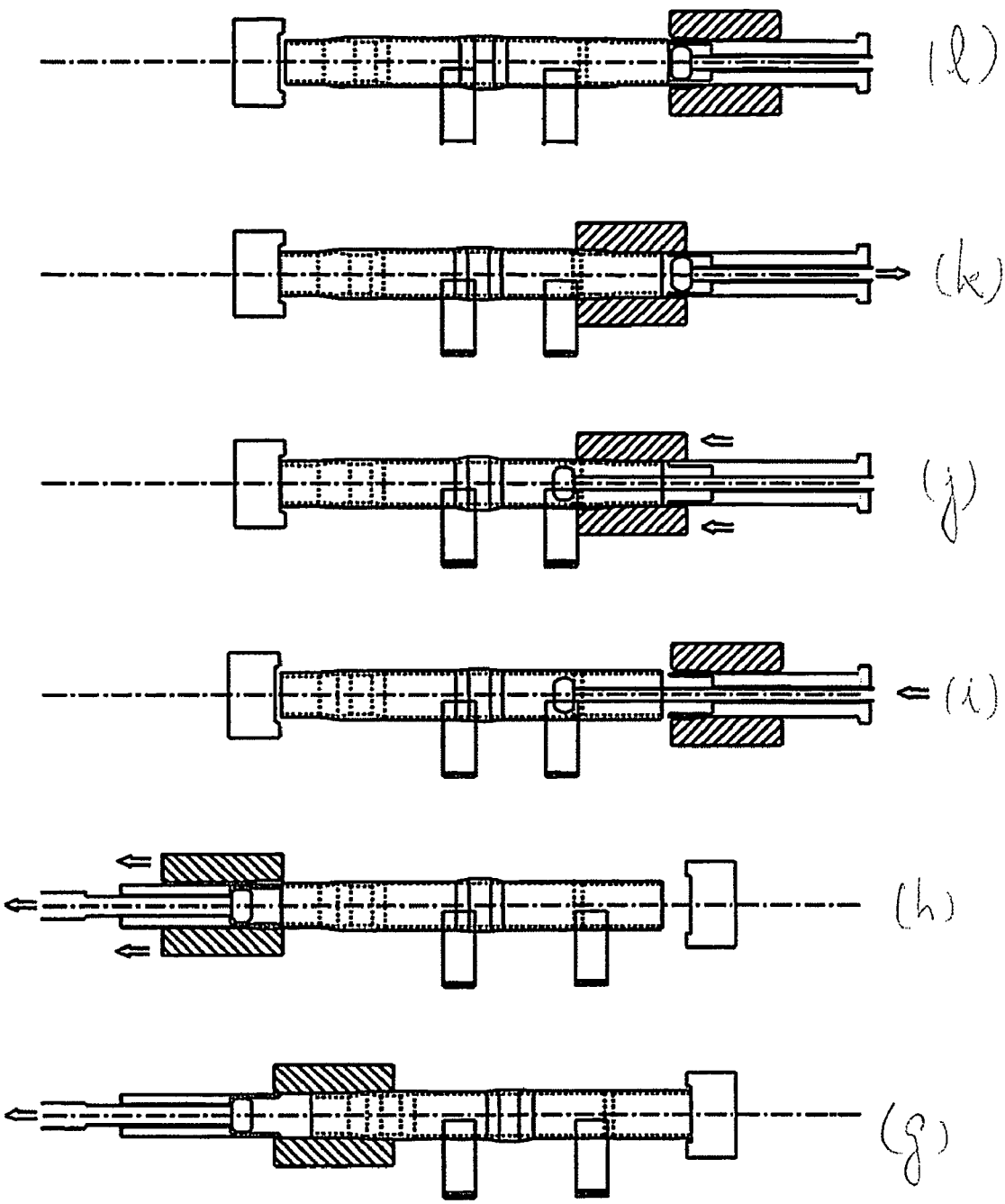

Following separation of the mandrel 100 and the extruded tube 300, the resulting tube as shown in FIG. 8 can then be further cold reduced, swaged or otherwise treated or formed to arrive at the final shape shown in FIG. 2. FIGS. 9(*a*) to 9(*l*) show the sequence of cold reducing and forming steps to produce a tube having the final cross sectional profile shown in FIG. 2, from an extruded tube 300 shown in FIG. 8.

First, an inner diameter sizing tool 402 supported in an end sizing die 404 is inserted into extruded tube 300 from the flange end 38, while the carrier end 42 of the tube rests against a stop block 406. The inner diameter sizing tool 402 has a sizing first 408 that has a size corresponding to the desired inner diameter of shock absorber load region 58. As shown in FIGS. 9(*a*) to 9(*d*), after the inner diameter sizing tool 402 is inserted into the extruded tube 300 and then advanced to the desired position, a location between the thickened regions 302, 304, the end sizing die 404 is advanced over the extruded tube to push the first thickened region 302 radially inward. The inner diameter sizing tool 402 is then withdrawn from the tube for a distance sufficient to resize the interior bulge 60 to the desired inner diameter. The end sizing die 404 and the inner diameter sizing tool 402 are then withdrawn from the extruded tube. As will be appreciated, the sizing first 408 of the inner diameter sizing tool 402 is sized to correspond to the small inner diameter of the interior bulge. Therefore, further withdrawal of the end sizing die 404 and the inner diameter sizing tool 402 does not produce any further deformation of the tube. At this stage, there is an extruded tube that has both an exterior bulge 54 and an interior bulge 60.

The final longitudinal cross sectional profile of the multi-wall tube 22 has end sections that have both thickened walls and reduced outer diameters. FIGS. 9(*e*) to 9(*h*) show the successive steps to re-size the inner diameter and cold reduce the outer diameter of the flange end 38, in a manner similar to that shown in FIGS. 9(*a*) to 9(*d*). Similar inner diameter sizing tool and end sizing die are used, with the first size and die throat diameter appropriately sized. FIGS. 9(*i*) to 9(*l*) show the successive steps to re-size the inner diameter and cold reduce the outer diameter of the other end, the carrier end 42 using another pair of appropriately sized inner diameter sizing tool and end sizing die.

It will be appreciated that the specific design and geometry of the mandrel 100 shown and described herein serves to form the axle housing as shown in FIG. 2 from a cylindrical tube blank. It will be appreciated that the method so described can be applied for forming any other tubular article. The mandrel used for manufacturing tubular articles of other longitudinal cross sectional shapes will have a shape, namely a cross sectional profile 112, depending on the shape of the article being formed. Further, a mandrel may take other non-cylindrical shapes, if a tubular product of an other than generally cylindrical shape is desired. For example, although a mandrel having a generally circular transverse cross section is shown and described, a mandrel can have any other transverse cross sectional shape and cross sectional circumference. For such a mandrel, a section having reduced cross sectional area will serve the same purpose and function of the sections of reduced diameter. Correspondingly, the extrusion die 200 will have a complementary non-circular throat for forming a non-cylindrical tubular product that has generally a transverse non-circular cross-sectional circumference.

As will be appreciated, the method of the present invention provides an axle housing tube that is formed from a one-piece blank tube. The method avoids the need for multiple welding steps as well as the possible deleterious effects resulting from the welding process such as structural weakening. Further, the method of the present invention permits the formation of a unitary tube having specifically localized regions of increased thickness for providing stiffness in areas subject to high stresses. In addition, by providing a method involving mainly the cold forming of the tubular blank, it will be understood that production costs will be lower with the invention (due to reduced energy demands by avoiding hot forging). By using only a single mandrel of an appropriate profile and providing further resizing steps, a tube that has both an exterior bulge and an interior bulge can be produced as a unitary tube. In the result, it will be appreciated that the present invention provides an efficient and cost effective method for producing tubular articles having various cross sectional profiles.

Although the present invention has been illustrated by means of referring to the manufacture of an axle housing, it will be appreciated that the present method can be used for manufacturing various types of tubular articles. Further, although references have been made to cylindrical articles, it will be understood that the invention is not limited to cylindrical or straight articles alone. Even where the method is used to provide a generally cylindrical article, such article can, of course, be further formed into various shapes.

Various embodiments of the invention have now been described in detail. Those skilled in the art will appreciate that numerous modifications, adaptations and variations may be made to the embodiments without departing from the scope of the invention. Since changes in and or additions to the above-described best mode may be made without departing from the nature, spirit or scope of the invention, the invention is not to be limited to those details but only by the appended claims.

What is claimed is:

1. A method for manufacturing a tubular article, the tubular article defining a longitudinal axis along its length, the tubular article having a first end, an opposite second end and a main body extending between the first and second ends,
the main body including a locally outwardly thickened first region spaced from the first end and a locally inwardly thickened second region between the first region and the second end, the second region being spaced from the second end,
the first region having a first wall thickness, a first inner diameter and a first outer diameter, and the second region having a second wall thickness, a second inner diameter and a second outer diameter,
the method comprising the steps of:
a) providing a tubular blank, the tubular blank having an inner surface and an outer surface;
b) axially inserting a mandrel into the tubular blank, the mandrel having a first mandrel end, a second mandrel end and a mandrel main body extending between the first and second mandrel ends,
the mandrel main body having a first section corresponding to the first region of the main body of the tubular article, the first section having a locally reduced first diameter corresponding to the first wall thickness,
and a second section corresponding to the second region of the main body of the tubular article, the second section having a locally reduced second diameter corresponding to the second wall thickness,
the first and second mandrel ends and the mandrel main body defining a longitudinal cross sectional mandrel profile,
c) longitudinally forcing the tubular blank with the mandrel contained therein through a throat of a first die to deform the inner surface of the tubular blank to conform to the mandrel profile and to obtain a deformed tubular blank having a first thickened region and a second thickened region corresponding to the first and second sections of the mandrel, respectively;
d) separating the mandrel from the deformed tubular blank while preventing the deformed tubular blank from passing through the throat, to cause outward deformation of the outer surface of the deformed tubular blank in the first and second thickened regions; and
e) forcing inwardly the second thickened region of the deformed and separated tubular blank to form the second region of the tubular article.

2. The method of claim 1, wherein the step of forcing inwardly the second thickened region comprising forcing the second thickened region through a throat of a reducing die.

3. The method of claim 2, further comprising:
between steps d) and e), positioning a sizing tool in the deformed and separated tubular blank between the first and second thickened regions, the sizing tool having a sizing diameter substantially the same as the second inner diameter of the second region of the tubular article, and
after step e), withdrawing the sizing tool while maintaining the inwardly formed second thickened region in the throat of the reducing die.

4. The method of claim 1, further comprising:
f) longitudinally forcing one end of the first and second ends of the tubular article through an end sizing throat of an end sizing die to reduce the one end to a smaller outer end diameter.

5. The method of claim 4, wherein the reduced one end has an inner end diameter after step f), the method further comprising:
before step f), inserting a sizing tool into the one end and positioning the sizing tool beyond the one end, the sizing tool having a sizing diameter greater than the inner end diameter of the reduced one end, and
after step f), withdrawing the sizing tool from the one end while maintaining the reduced one end in the end sizing throat.

6. The method of claim 1 wherein the first mandrel end has a mandrel end diameter less than an outer diameter of a region of the mandrel body adjacent the first mandrel end and the step of separating comprises removing the mandrel from the second mandrel end.

7. A method for manufacturing a tubular axle housing from an integral tubular blank, the tubular blank having an inner surface and an outer surface, the tubular axle housing defining a longitudinal axis along its length,
the axle housing having a carrier end for supporting a brake assembly, a flange end opposite the carrier end for attaching the axle housing to a vehicle, and a main body extending between the carrier and flange ends,
the main body including a first load bearing region spaced from the carrier end for supporting a spring seat and a second load bearing region between the first load bearing region and the flange end for supporting a shock absorber,
the first load bearing region being locally outwardly thickened and having a first wall thickness, a first inner diameter and a first outer diameter,
the second load bearing region being locally inwardly thickened and having a second wall thickness, a second inner diameter and a second outer diameter,
one end of the carrier and flange ends having an inner end diameter smaller than an inner diameter of a region of the main body adjacent the one end,
the method comprising the steps of:
a) axially inserting a mandrel into the tubular blank, the mandrel having a first mandrel end corresponding to the carrier end, an opposite second mandrel end corresponding to the flange end, and a mandrel main body extending between the first and second mandrel ends,
the mandrel main body having a first section corresponding to the first load bearing region of the main body of the axle housing, the first section having a locally reduced first diameter corresponding to the first wall thickness,
and a second section corresponding to the second load bearing region of the main body, the second section having a locally reduced second diameter corresponding to the second wall thickness,
one mandrel end of the first and second mandrel ends having a mandrel end diameter substantially the same as the inner end diameter of the one end of the carrier and flange ends,
the first and second mandrel ends and the mandrel main body defining a longitudinal cross sectional mandrel profile,
b) longitudinally forcing the tubular blank with the mandrel contained therein through a throat of a first die to deform the inner surface of the tubular blank to conform to the mandrel profile and to obtain a deformed tubular blank having a first thickened region and a second thickened region corresponding to the first and second sections of the mandrel, respectively, and a third thickened region corresponding to the one mandrel end having the mandrel end diameter;
c) separating the mandrel from the deformed tubular blank from the other end of the first and second mandrel ends while preventing the deformed tubular blank from passing through the throat, to cause outward deformation of the outer surface in the first and second thickened regions; and
d) forcing inwardly the second thickened region of the deformed and separated tubular blank to form the second load bearing region of the axle housing.

8. The method of claim 7, further comprising:
between steps c) and d), positioning a sizing tool in the deformed and separated tubular blank between the first and second thickened regions, the sizing tool having a sizing diameter substantially the same as the second inner diameter of the second load bearing region, and wherein step d) further comprises:
longitudinally forcing the second thickened region through a throat of a sizing die, and
withdrawing the sizing tool while maintaining the inwardly deformed second thickened region in the throat of the sizing die.

9. The method of claim 7, wherein the other end of the carrier and flange ends has a second end inner diameter and the method further comprising:
e) inserting an end sizing tool into the other end, the end sizing tool having an end sizing diameter substantially the same as the second end inner diameter of the other end,
f) longitudinally forcing the other end through a throat of an end sizing die to reduce the other end to a smaller outer end diameter, and
g) withdrawing the end sizing tool while maintaining the reduced other end in the throat of the end sizing die.

* * * * *